United States Patent [19]
Huang et al.

[11] Patent Number: 5,668,207
[45] Date of Patent: Sep. 16, 1997

[54] STYRENIC RESIN COMPOSITION

[75] Inventors: Wen-Ping Huang; Dong-Bi Shiueh, both of Tainan, Taiwan

[73] Assignee: Chi Mei Corporation, Tainan Hsien, Taiwan

[21] Appl. No.: 692,672

[22] Filed: Aug. 6, 1996

[51] Int. Cl.$^6$ .................................................. C08K 5/01
[52] U.S. Cl. .................................................. 524/483
[58] Field of Search .................................................. 524/483

[56] References Cited

U.S. PATENT DOCUMENTS

| | | | |
|---|---|---|---|
| 3,819,447 | 6/1974 | Dalibor et al. | 156/330 |
| 4,650,822 | 3/1987 | Veazey et al. | 524/376 |

*Primary Examiner*—Peter D. Mulcahy
*Attorney, Agent, or Firm*—Ladas & Parry

[57] ABSTRACT

A styrenic resin composition with little foul odor is provided. The styrenic resin composition contains:

(1) 99.995–95.0 wt % of a styrenic resin which is made from 5–100 wt % of rubbery graft copolymer (A) and 95–0 wt % of styrenic copolymer (B), wherein the rubbery graft copolymer (A) is prepared by graft polymerization of 50 to 90 wt % of vinyl aromatic monomers, 10 to 50 wt % of vinyl cyanide monomers and 0–40 wt % of copolymerizable monomers in the presence of rubbery polymer; and (2) 0.005–5.0 wt % of a sesquiterpene compound (C).

7 Claims, No Drawings

STYRENIC RESIN COMPOSITION

BACKGROUND OF THE INVENTION

1. Field of the Invention

The present invention relates to a styrenic resin composition, particularly to a styrenic resin composition which generate little unpleasant odor, which has good balance in physical properties thereof, which is adapted for various type of processing, and which is suitable for long-term operation.

2. Description of the Related Art

A styrenic resin composition is an impact resistant resin composition made by dispersing rubbery graft copolymer in a styrenic copolymer matrix. In practical application, styrenic resins can undergo several kinds of processing (for example, primary processing, such as injection molding and extrusion, and secondary processing, such as thermoforming and blow molding) to form a shaped commercial product. Under the current trends of environmental protection and of making the work place more pleasant for the workers, more attention is being paid to the smell of the work place. It is well known that workers are exposed to the unpleasant smell when the styrenic resins undergo various kinds of processing. It is therefore an important subject in the art to develop a styrenic resin composition which generates little unpleasant odor during its processing and which enables an operator to bear long-term exposure to the same.

In order to eliminate the unpleasant odor generated during the processing of the styrenic resin, the addition of antioxidants and enhanced devolatilization have been suggested so as to reduce the content of the residual monomer, thereby reducing the unpleasant odor. However, the improvement achieved thereby is not significant since only one of the many sources of the unpleasant odor is reduced and thus, the improvement in reducing the unpleasant odor is limited. The above suggested method is still not suitable for long-term exposure of an operator, who is carrying out operations such as injection and extrusion of the styrenic resin. This is because the aforementioned method only delays the operator's sensing of the unpleasant odor.

Accordingly, a styrenic resin composition which generates little unpleasant odor, which is adapted to various kinds of processing, and which is suitable for long term operations is proposed to overcome the aforementioned drawbacks, without adversely affecting the balance in physical properties of the resin composition.

SUMMARY OF THE INVENTION

It is the main object of the present invention to provide a styrenic resin composition which generate little unpleasant odor, which has good balance in physical properties, and which is suitable for long-term operations. The styrenic resin composition is produced by adding a sesquiterpene compound to the styrenic resin during the manufacturing or blending process. Thereby, the unpleasant odor generated during processing can be effectively eliminated and a mild fragrance of wood which is acceptable to an operator is simultaneously generated.

DETAILED DESCRIPTION OF THE PREFERRED EMBODIMENT

The rubber modified styrenic resin composition of the present invention includes:

(1) 99.995–95.0 wt % of a rubber modified styrenic resin which is made from 5–100 wt % of rubbery graft copolymer (A) and 95–0 wt % of styrenic copolymer (B), wherein the rubbery graft copolymer (A) is prepared by grafting a copolymer, which is prepared from graft polymerization 50 to 90 wt % of vinyl aromatic monomers, 10 to 50 wt % of vinyl cyanide monomers and 0–40 wt % of copolymerizable monomers onto a dienic rubbery polymer, and wherein the styrenic copolymer (B) comprises 50–90 wt. % of vinyl aromatic monomers; and (2) a deodorizing agent containing 0.005–5.0 wt % of sesquiterpene (C) having a formula $C_{15}H_{24}$.

The components are melt blended to form a rubber modified styrenic resin composition which can be used in any molding process, which generates little unpleasant odor, which has good balance in physical properties, and which is suitable for long-term exposure thereto by an operator.

The rubbery graft copolymer of the present invention is prepared by bulk, solution, suspension or emulsion polymerization of 50 to 90 wt % of vinyl aromatic monomers, 10 to 50 wt % of vinyl cyanide monomers and 0 to 40 wt % of copolymerizable monomers in the presence of rubbery polymer, based on 100 wt % of monomers. Alternatively, the rubbery graft copolymer may be prepared by a combination of the bulk, solution, suspension or emulsion polymerization, such as emulsion-bulk polymerization or bulk-suspension polymerization. Emulsion polymerization is preferred.

A latex of rubbery graft copolymer (A) having a weight average particle size of 0.05–0.8 μm is preferably prepared by graft polymerization of 50 to 90 wt % of vinyl aromatic monomers, 10 to 50 wt % of vinyl cyanide monomers and 0 to 40 wt % of copolymerizable monomers in the presence of a dienic rubber latex. A powdery rubbery graft copolymer (A) is subsequently obtained by means of coagulation, dehydration and drying. The rubber content of the emulsion polymerized rubbery graft copolymer (A) is generally 15–85 wt %, preferably 45–80 wt %. The dienic rubber latex includes a homopolymer or copolymer prepared from 100 to 60 wt % of conjugate diene monomer and 0 to 40 wt % of copolymerizable unsaturated monomer. The conjugate diene is represented as follows:

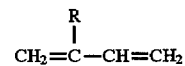

wherein, R is hydrogen, methyl group or chlorine. The copolymerizable unsaturated monomer is a vinyl aromatic monomer, vinyl cyanide monomer, methacrylate monomer, acrylate monomer or a mixture thereof.

The dienic rubber latex is selected from polybutadiene, butadiene-styrene copolymer, butadiene-acrylonitrile copolymer, isoprene-butylacrylate copolymer and butadiene-methyl methacrylate copolymer. The dienic rubber latex having a weight average particle size of 0.05 to 0.8 μm may be directly polymerized from the above diene monomers and copolymerizable monomers. Alternatively, a rubber latex having a small particle size of 0.05 to 0.18 μm may be pre-polymerized from the above diene monomers. The butadienic rubber latex is then agglomerated by a conventional agglomerating method to form a butadienic rubber latex of 0.2 to 0.8 μm. The rubber agglomerating methods include a chemical agglomerating method which is achieved by adding an organic acid, a metal salt or a carboxylic acid group-containing polymeric agglomerating agent into the butadienic rubber latex, a mechanical stirring agglomerating method, and a freezing agglomerating method. Butyl acrylate-methacrylic acid copolymer may be used as the polymeric agglomerating agent in the chemical agglomerating method.

The rubbery graft copolymer (A) prepared by emulsion polymerization (abbreviated as emulsion graft copolymer) can be a monomodal particle size distribution, in which the weight average particle size is 0.05 to 0.8 μm, or a bimodal particle size distribution, in which the weight average particle size of the first modal is 0.05 to 0.18 μm and the weight average particle size of the second modal is 0.2 to 0.8 μm.

The bulk or solution polymerization process for preparing the rubbery graft copolymer (A) includes pre-dissolving a dienic rubber in a mixture of monomers and, optionally, solvents. The mixture of monomers includes 50 to 90 wt % of vinyl aromatic monomers, 10 to 50 wt % of vinyl cyanide monomers and 0 to 40 wt % of copolymerizable monomers. The resulting solution is pumped into a reaction tank and is completely mixed to undergo a graft polymerization process. Optionally, a suitable amount of a chain transfer agent (such as tert-dodecyl mercaptan) may be added during the reaction to control the molecular weight of the polymer. The reaction tank may also be a combination of a plurality of tanks. A continuous stirring tank reactor (CSTR) with a powerful mixing device is preferable.

Examples of the dienic rubber used for bulk or solution polymerization are preferably butadiene rubber, isoprene rubber and chloroprene rubber. The butadiene rubber includes high cis-type rubber and low cis-type rubber. In the high cis-type rubber, the typical micro-structure of cis vinyl group is 94–98%/1–5%, with the remaining being in a trans micro-structure. The Mooney viscosity thereof is preferably between 20 to 120. The molecular weight is preferably in the range of 100,000–800,000. In the low cis-type rubber, the micro-structure of the cis vinyl group is between 20–40%/1–20%, with the remaining being trans micro-structure. The Mooney viscosity thereof is between 20 to 120. Examples of other suitable rubber material include acrylonitrile-butadiene rubber, styrene/butadiene rubber (SBR). The rubbery polymer used for preparing the bulk or solution rubbery graft copolymer may be one rubbery polymer or a mixture of the rubbery polymers described above. The styrene/butadiene rubber may be di-block copolymerization, tri-block copolymerization, random copolymerization or star type copolymerization. The weight ratio of the styrene/butadiene is preferably between 5/95 to 80/20 for styrene/butadiene rubber. The molecular weight thereof is in the range of 50,000 to 600,000. The rubber suitable for use in the present invention is preferably butadiene rubber and styrene/butadiene rubber, more preferably butadiene rubber.

The weight average particle size of the rubbery graft copolymer (A) prepared by bulk or solution polymerization (hereinafter abbreviated as bulk or solution graft copolymer) is generally between 0.2–10 μm, preferably between 1.0–7.0 μm. The rubber content of the bulk or solution polymerized rubbery graft copolymer (A) is generally 3–25 wt %, preferably 4–15 wt %.

The emulsion graft copolymer or bulk (or solution) graft copolymer may be individually used as the rubbery graft copolymer (A) of the present invention, or may be combined to have a bimodal or trimodal particle size distribution.

The bimodal distribution is represented as follows:

(1) the weight average particle sizes of the rubber particles are between 0.2–0.8 μm (emulsion polymerization) and between 0.2–10 μm (bulk or solution polymerization); or (2) the weight average particle sizes of the rubber particles are between 0.05–0.18 μm (emulsion) and between 0.2–10 μm (bulk or solution).

The trimodal distribution is represented as follows: the weight average particle sizes of the rubber particles are between 0.05–0.18 μm (emulsion polymerization), between 0.2–0.8 μm (emulsion polymerization) and between 0.2–10 μm (bulk or solution polymerization).

The weight average particle size of the rubber particles is determined by means of a relatively thin section of resin or emulsion film which is dyed primarily and which is then photographed by a transmission electron microscope. There are about 200–1000 dispersed rubber particles presented on the photograph, and the particle sizes thereof are determined individually. The weight average particle size, which is based on 200–1000 rubber particles, can be calculated through the following formula:

$$\frac{\Sigma n_i D_i^4}{\Sigma n_i D_i^3}$$

$n_i$ is the number of rubber particles which have the diameter of Di.

Generally, the rubber particles are spherical or ellipsoidal. If it is spherical, Di is the diameter of the rubber particle. If it is ellipsoidal, $Di=(p+q)/2$ is the average of its major axis diameter (p) and minor axis diameter (q).

The vinyl aromatic monomers for use in the present invention may be selected from the group consisting of styrene, α-methyl styrene, para-chlorostyrene, para-tert-butyl styrene, para-methyl styrene, ortho-chlorostyrene, para-chlorostyrene, 2,5-dichlorostyrene, 3,4-dichlorostyrene, 2,4,6-tribromostyrene and 2,5-dibromostyrene. Styrene and α-methyl styrene are preferred.

Examples of the vinyl cyanide monomers for use in the present invention include, for example, acrylonitrile and α-methyl acrylonitrile. Acrylonitrile is preferred.

The copolymerizable monomer used for preparing the rubbery graft copolymer (A) may be selected from the group consisting of acrylate monomers, methacrylate monomers, maleimide-based monomers, acrylic acid, mathacrylic acid, maleic anhydride and ethylene glycol methacrylate. Examples of the methacrylate monomer are methyl methacrylate, ethyl methacrylate, propyl methacrylate, butyl methacrylate, benzyl methacrylate, hexyl methacrylate, cyclohexyl methacrylate, dodecyl methacrylate, 2-hydroxyethyl methacrylate, glycidyl methacrylate and dimethylaminoethyl methacrylate. Methyl methacrylate is preferred. Examples of acrylate monomers are methyl acrylate, ethyl acrylate, propyl acrylate and butyl acrylate. Butyl acrylate is preferred.

The maleimide based monomer is selected from the group consisting of maleimide, N-methyl maleimide, N-isopropyl maleimide, N-butyl maleimide, N-hexyl maleimide, N-octyl maleimide, N-dodecyl maleimide, N-cyclohexyl maleimide, N-phenyl maleimide, N-2,3-dimethyl phenyl maleimide, N-2,4-dimethyl phenyl maleimide, N-2,3-diethyl phenyl maleimide, N-2,4-diethyl phenyl maleimide, N-2,3-dibutyl phenyl maleimide, N-2,4-dibutyl phenyl maleimide, N-2,6-dimethyl phenyl maleimide, N-2,3-dichlorophenyl maleimide, N-2,4-dichlorophenyl maleimide, N-2,3-dibromophenyl maleimide and N-2,4-dibromophenyl maleimide. N-phenyl maleimide is preferred.

The styrenic copolymer (B) is made by polymerization from 90 to 50 parts by weight of vinyl aromatic monomers, 10 to 50 parts by weight of vinyl cyanide monomers and, optionally, 0 to 40 parts by weight of copolymerizable monomers. Examples of the vinyl aromatic monomers, vinyl cyanide monomers and copolymerizable monomers are the same as those described in the rubbery graft copolymer (A).

The styrenic copolymer (B) may be prepared by bulk, solution, suspension or emulsion polymerization. Bulk and solution polymerization is preferred. The weight average molecular weight is in the range of 60,000 to 400,000. The number average molecular weight is in the range of 30,000 to 200,000. If the molecular weight is higher than 200,000, it would result in difficulty in processing. If the molecular weight is lower than 30,000, it would result in poor impact resistance.

The sesquiterpene compound (C) used in the present invention is a general name for the compound having a formula of $C_{15}H_{24}$. Examples of the sesquiterpene compound (C) include cadinenes, caryophyllene, copaene, α-farnesene, β-farnesene, humulene, longifolene, thujopsene and ylangene. The content of sesquiterpene compound (C) in the styrenic resin composition is 0.005–5.0 wt %, preferably 0.01–2.0 wt % based on 100 wt % of the styrenic resin composition. If the content is less than 0.005 wt %, the unpleasant odor is still to be a problem. If the content thereof is greater than 5.0 wt %, it would generate some kind of new odor which is too strong to be pungent to the worker under long term operation.

The rubbery graft copolymer (A), styrenic copolymer (B) and a sesquiterpene compound (C) are blended by a conventional blending method to produce a styrenic resin composition desired in the present invention. It is founded that part of the sesquiterpene compound (C) is stripped from the resin composition during extension. The amount of the sesquiterpene compound (C) used in the melt extrusion procedure is usually higher than the amount remains in the final styrenic resin composition, which is due to its high volatility. The rubber content of the styrenic resin composition of the present invention is generally 3–30 wt %, preferably 5–25 wt %. The styrenic resin composition generates little unpleasant odor, has good balance in physical properties and is suitable for long-term operations.

The blending device includes a single screw extruder, twin screw extruder, a blending roller and an internal blender. Optionally, the styrenic resin composition of the present invention may include a suitable additives. The additives may be light stabilizers, lubricants, rheology aids, UV-absorber, antioxidants, anti-statics, fillers, glass fibers, processing aids and pigments.

The present invention is more specifically described and explained by means of the following examples. It is to be understood, however, that the present invention is not limited to these Examples. Unless otherwise indicated, the parts are all based on weight.

PREPARATION EXAMPLE 1

Preparation of rubbery graft copolymer (A-1)

| components | weight parts |
| --- | --- |
| 1,3-butadiene | 150.00 |
| potassium persulfate solution (1%) | 15.00 |
| potassium oleate | 2.00 |
| distilled water | 190.00 |
| ethylene glycol methacrylate | 0.13 |

The above components were reacted at 65° C. for 12 hours to yield a synthetic rubber latex with a conversion of monomer of 94% and having a weight average particle size of 0.1 μm. The solid content of the synthetic rubber latex is 40%.

A carboxylic acid group-containing polymeric agglomerating agent was prepared from the following components:

| components | weight parts |
| --- | --- |
| ethyl acrylate | 90.0 |
| methacrylic acid | 10.0 |
| potassium persulfate solution (1%) | 0.5 |
| sodium dodecyl sulfate solution (10%) | 1.0 |
| n-dodecyl mercaptan | 1.0 |
| distilled water | 200.0 |

The above components were reacted at 75° C. for 5 hours to yield a carboxylic acid group-containing polymeric agglomerating agent with a conversion of monomer of 95% and a pH value of 6.0.

100 parts by weight (dry weight) of the synthetic rubber latex was then agglomerated with 3 parts by weight (dry weight) of the carboxylic acid group-containing polymeric agglomerating agent to produce an agglomerated rubber latex having a pH value of 8.5 and a weight average particle size of about 0.31 μm.

The rubber graft copolymer (A-1) is prepared by graft polymerization according to the following recipe.

| components | weight parts |
| --- | --- |
| agglomerated rubber latex (dry weight, 0.31 μm) | 100.0 |
| styrene | 25.0 |
| acrylonitrile | 8.3 |
| potassium oleate | 1.2 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| ethylene diamine tetraacetic acid solution (0.25%) | 3.0 |
| distilled water | 200.0 |

The rubbery graft copolymer latex prepared from the above recipe is then coagulated with calcium chloride ($CaCl_2$) to produce the rubbery graft copolymer (A-1) (rubber content=75 wt %) desired in the present invention. The weight average particle size thereof is 0.31 μm.

PREPARATION EXAMPLE 2

Preparation of rubbery graft copolymer (A-2)

A rubbery graft copolymer (A-2) is prepared by graft polymerization according to the following recipe.

| components | weight parts |
| --- | --- |
| synthetic rubber latex (0.1 μm) (dry weight) (from Preparation Example I-1) | 100.0 |
| styrene | 32.4 |
| acrylonitrile | 12.6 |
| potassium oleate | 1.5 |
| tert-dodecyl mercaptan | 2.0 |
| cumene hydroperoxide | 3.0 |
| ferrous sulfate solution (0.2%) | 3.0 |
| Rongalite solution (10%) | 0.9 |
| ethylene diamine tetraacetic acid solution (0.25%) | 3.0 |
| distilled water | 200.0 |

The rubbery graft copolymer latex prepared from the above recipe is then coagulated with calcium chloride ($CaCl_2$) to produce the rubbery graft copolymer (A-2) (rubber content=69 wt %) desired in the present invention. The weight average particle size thereof is 0.1 μm.

PREPARATION EXAMPLE 3

Preparation of rubbery graft copolymer (A-3)

6.6 parts by weight of polybutadiene (available from Asahi Kasei company under the trade name of Asadene 55AS), 0.1 part by weight of tert-dodecyl mercaptan and 0.07 part by weight of benzoyl peroxide were completely dissolved in 74.4 parts by weight of styrene, 25.6 parts by weight of acrylonitrile and 30 parts by weight of ethylbenzene to form a feed solution. The feed solution is continuously fed into a first reactor having a capacity of 44 liters. The reaction temperature was 100° C. A screw type mixing device having a circulating cooling coil and rotating at a rate of 300 rpm is provided in the reactor. The reacted mixture was continuously delivered from the first reactor into a second reactor which is structurally identical to the first reactor. The conversion of the reaction mixture in the second reactor is 60% and the reacted mixture was then delivered into a devolatilizing device for the removal of unreacted monomers and volatile components. The devolatilized mixture was then extruded and pelletized to form a rubbery graft copolymer (A-3). The weight average particle size of the rubber particle is about 1.1 μm and the rubber content of the rubbery graft copolymer (A-3) is 11 wt %.

The test methods of the physical properties and the odor evaluation in Examples and Comparative Examples are as follows:

*Tensile strength is tested in accordance with ASTM D-638. The unit adapted is kg/cm$^2$.

*Izod impact strength (IZOD) is tested in accordance with ASTM D-256. The unit adapted is kg.cm/cm.

*Melt flow index (MI) is tested in accordance with ASTM D1238. The unit adapted is g/10 min.

*Odor evaluation:
The styrenic resin composition is extruded by a twin screw extruder to produce the sheet product. The odor was evaluated by a group of people including five or more members who smell the odor generated beside the die head of the extruder for a period of 1 hour to decide whether the odor is acceptable and is suitable for long-term operation or not. "O" indicates that the odor was considered acceptable by all of the members of the judging group. "X" indicates that the odor was considered unpleasant by any one of the members.

EXAMPLES

Example 1

100 parts by weight of the styrenic resin which is made from 18.7 wt % of the rubbery graft copolymer (A-1) prepared in Preparation Example 1 and 81.3 wt % of styrenic copolymer (B) are used. The weight average molecular weight (Mw) of the styrenic copolymer (B) is 130,000 and the number average molecular weight (Mn) thereof is 64,000. The acrylonitrile content of the styrenic copolymer (B) is 28 wt % and the styrene content thereof is 72 wt %. The rubber content of the styrenic resin is 14 wt %.

1.0 part by weight of a sesquiterpene compound (C), "Sesquiterpene" (a trade name of YASUHARA Chem. Co.), is then melt blended with the styrenic resin. The styrenic resin composition is extruded and is cut into pellets. About 66.6 wt % of the Sesquiterpene is stripped off during the extrusion, which is due to its high volatility. Afterwards, the content of the Sesquiterpene which is determined by gas chromatography, is 0.334 wt %, based on 100 wt % of the styrenic resin composition. The physical properties thereof and the odor that is generated are evaluated. The results are listed in Table 1-1 and Table 2.

Example 2

The procedure of Example 1 is repeated except that the ratio of rubbery graft copolymer (A-1) to styrenic copolymer (B) is different. In addition, the weight average molecular weight (Mw) of the styrenic copolymer (B) is 140,000 and the number average molecular weight (Mn) thereof is 69,000. The acrylonitrile content of the styrenic copolymer (B) is 24 wt % and the styrene content thereof is 76 wt %. The rubber content of the styrenic resin is 23.5 wt %. Only odor evaluation was conducted. The results are listed in Table 1-1.

Example 3

The procedure of Example 1 is repeated except that 0.1 part by weight of Sesquiterpene is used for blending. The content of Sesquiterpene in the styrenic composition is 0.033 wt %. The results are listed in Table 1-1 and Table 2.

Example 4

The procedure of Example 1 is repeated except that Sesquiterpene is used for blending in an amount of 5.0 parts by weight. The content of Sesquiterpene in the styrenic resin composition is 1.65 wt %. The results are listed in Table 1-1 and Table 2.

Example 5

The procedure of Example 1 is repeated except that the rubbery graft copolymer (A) is used in an amount of 23.3 wt %, which includes 9.3 wt % of rubbery graft copolymer (A-1) and 14 wt % of rubber graft copolymer (A-2), and the styrenic copolymer (B) is used in an amount of 76.7 wt %. The results are listed in Table 1- 1.

Example 6

100 parts by weight of rubbery graft copolymer (A-3) and 1.0 part by weight of Sesquiterpene were used to prepared the styrenic resin composition. The physical properties of the product and the odor that is generated were evaluated. The results are listed in Table 1-1.

Example 7

The procedure of Example 1 was repeated except that the rubbery graft copolymer (A) was used in an amount of 44.5 wt %, including 16.5 wt % of rubbery graft copolymer (A-1) and 28 wt % of rubbery graft copolymer (A-3) and that a styrenic copolymer (B) having a higher molecular weight (Mw=230,000; Mn=120,000) was used in an amount of 55.5 wt %. The results are listed in Table 1-1.

Example 8

The procedure of Example 7 was repeated except that the rubbery graft copolymer (A) was used in an amount of 42.2 wt %, which includes 8.9 wt % of rubbery graft copolymer (A-1), 13.3 wt % of rubbery graft copolymer (A-2) and 20 wt % of rubbery graft copolymer (A-3) and the styrenic copolymer (B) was used in an amount of 57.8 wt %. The results are listed in Table 1-1.

TABLE 1-1

|  | Example | | | | | | | |
|---|---|---|---|---|---|---|---|---|
|  | 1 | 2 | 3 | 4 | 5 | 6 | 7 | 8 |
| styrenic resin rubber graft copolymer (A) | | | | | | | | |
| Rubber graft copolymer (A-1) (wt %) | 18.7 | 31.3 | 18.7 | 18.7 | 9.3 | — | 16.5 | 8.9 |
| Rubber graft copolymer (A-2) (wt %) | — | — | — | — | 14.0 | — | — | 13.3 |
| Rubber graft copolymer (A-3) (wt %) | — | — | — | — | — | 100 | 28 | 20 |
| styrenic copolymer (B) | | | | | | | | |
| Content (wt %) | 81.3 | 68.7 | 81.3 | 81.3 | 76.7 | — | 55.5 | 57.8 |
| Weight average molecular weight (Mw) × $10^4$ | 13 | 14 | 13 | 13 | 13 | — | 23 | 23 |
| Number average molecular weight (Mn) × $10^4$ | 6.7 | 6.9 | 6.7 | 6.7 | 6.7 | — | 12 | 12 |
| Acrylonitrile (wt %) | 28 | 24 | 28 | 28 | 28 | — | 28 | 28 |
| Styrene (wt %) | 72 | 76 | 72 | 72 | 72 | — | 72 | 72 |
| Sesquiterpene (weight part) | 1.0 | 1.0 | 0.1 | 5.0 | 1.0 | 1.0 | 1.0 | 1.0 |
| Terpinolene (weight part) | — | — | — | — | — | — | — | — |
| Dipentene (weight part) | — | — | — | — | — | — | — | — |
| Limonene (weight part) | — | — | — | — | — | — | — | — |
| Vanilla Spice (weight part) | — | — | — | — | — | — | — | — |
| Lavender Spice (weight part) | — | — | — | — | — | — | — | — |
| Rubber content of the styrenic resin composition (wt %) | 14 | 23.5 | 14 | 14 | 16.6 | 11 | 15.5 | 18 |
| Odor evaluation | O | O | O | O | O | O | O | O |
| Content of the Sesquiterpene Compound (C) in the styrenic resin composition (wt %) | 0.33 | 0.33 | 0.033 | 1.65 | 0.33 | 0.33 | 0.33 | 0.33 |

Comparative Example 1

The procedure of Example 1 was repeated except that the amount of Sesquiterpene is 0 parts by weight. The results, which are listed in Table 1-2 and Table 2, indicate that an unpleasant odor will be generated if a sesquiterpene compound is not included in the components.

Comparative Example 2

The procedure of Comparative Example 1 is repeated except that 0.005 part by weight of Sesquiterpene is used for blending procedure. The content of Sesquiterpene in the styrenic resin composition is 0.002 wt %. The results, which are listed in Table 1-2, indicate that an unpleasant odor will still be generated if the content of Sesquiterpene is less than 0.005 wt %.

Comparative Example 3

The procedure of Comparative Example 1 is repeated except that 20.0 parts by weight of Sesquiterpene are used in the blending procedure. The content of Sesquiterpene in the styrenic resin composition is 6.2 wt %. The results, which are listed in Table 1-2, indicate that if the sesquiterpene compound is used in an excessive amount, the new odor that is generated would be too strong and is not suitable for long-term operations.

Comparative Example 4

The procedure of Comparative Example 1 was repeated except that 2.0 parts by weight of Terpinolene were added. The results are listed in Table 1-2. The results indicate that the unpleasant odor was not eliminated from the resulting composition.

Comparative Example 5

The procedure of Comparative Example 4 was repeated except 2.0 parts by weight of Dipentene was used. The results are listed in Table 1-2. The results indicate that the unpleasant odor was not eliminated from the resulting composition.

Comparative Example 6

The procedure of Comparative Example 4 is repeated except that 2.0 parts by weight of Limonene were used. The results are listed in Table 1-2. The results indicate that the unpleasant odor was not eliminated from the resulting composition.

Comparative Example 7

The procedure of Comparative Example 4 is repeated except that 2.0 parts by weight of Vanilla Spice were used. The results, which are listed in Table 1-2, indicate that not only the unpleasant odor was not eliminated from the resulting composition but a new pungent unpleasant odor was also generated.

Comparative Example 8

The procedure of Comparative Example 1 is repeated except that 2.0 parts by weight of Lavender Spice were used. The results are listed in Table 1-2. The results indicate that a strong pungent odor is generated from the resulting composition. The new strong odor causes discomfort to the respiratory tract and is not suitable for long-term operations.

It is shown from the results of Comparative Examples 4–8 that various spice added to the styrenic resin can not eliminate the unpleasant odor generated during extrusion, and that some of the spice even result in new pungent odor.

Comparative Example 9

The procedure of Comparative Example 1 is repeated except that styrenic copolymer (B), which has a lower molecular weight, was used, and that 1.0 part by weight of Sesquiterpene is added. The resulting composition contains 0.33 wt % of Sesquiterpene and has only very little odor. However, the mechanical properties thereof, such as the impact strength, is poor.

TABLE 1-2

| | Comparative Example | | | | | | | | |
|---|---|---|---|---|---|---|---|---|---|
| | 1 | 2 | 3 | 4 | 5 | 6 | 7 | 8 | 9 |
| styrenic resin rubber graft copolymer (A) | | | | | | | | | |
| Rubber graft copolymer (A-1) (wt %) | 18.7 | 18.7 | 18.7 | 18.7 | 18.7 | 18.7 | 18.7 | 18.7 | 18.7 |
| Rubber graft copolymer (A-2) (wt %) | — | — | — | — | — | — | — | — | — |
| Rubber graft copolymer (A-3) (wt %) | — | — | — | — | — | — | — | — | — |
| styrenic copolymer (B) | | | | | | | | | |
| Content (wt %) | 81.3 | 81.3 | 81.3 | 81.3 | 81.3 | 81.3 | 81.3 | 81.3 | 81.3 |
| Weight average molecular weight (Mw) $\times 10^4$ | 13 | 13 | 13 | 13 | 13 | 13 | 13 | 13 | 6.8 |
| Number average molecular weight (Mn) $\times 10^4$ | 6.7 | 6.7 | 6.7 | 6.7 | 6.7 | 6.7 | 6.7 | 6.7 | 3.0 |
| Acrylonitrile (wt %) | 28 | 28 | 28 | 28 | 28 | 28 | 28 | 28 | 28 |
| Styrene (wt %) | 72 | 72 | 72 | 72 | 72 | 72 | 72 | 72 | 72 |
| Sesquiterpene (weight part) | 0 | 0.005 | 20.0 | — | — | — | — | — | 1.0 |
| Terpinolene (weight part) | — | — | — | 2.0 | — | — | — | — | — |
| Dipentene (weight part) | — | — | — | — | 2.0 | — | — | — | — |
| Limonene (weight part) | — | — | — | — | — | 2.0 | — | — | — |
| Vanilla Spice (weight part) | — | — | — | — | — | — | 2.0 | — | — |
| Lavender Spice (weight part) | — | — | — | — | — | — | — | 2.0 | — |
| Rubber content of the styrenic resin composition (wt %) | 14 | 14 | 14 | 14 | 14 | 14 | 14 | 14 | 14 |
| Odor evaluation | X | X | X | X | X | X | X | X | O |
| Content of the Sesquiterpene Compound (C) in the styrenic resin composition (wt %) | * | 0.002 | 6.2 | * | * | * | * | * | 0.33 |
| Note | a | a | b | a | a | a | c | d | — | a: Existence of an unpleasant odor.
b: A new strong odor is generated, which is not suitable for long-term operation.
c: A new pungent unpleasant odor is generated.
d: A new pungent unpleasant odor is generated, which is uncomfortable to the respiratory tract.
*: not detectable.

TABLE 2

| | Example | | | Comparative Example | |
|---|---|---|---|---|---|
| | 1 | 3 | 4 | 1 | 9 |
| Tensile strength (kg/cm$^2$) | 475 | 483 | 452 | 487 | 430 |
| Izod impact strength (kg · cm/cm) | 19.1 | 19.0 | 20.5 | 19.2 | 6.1 |
| Melt flow index (g/10 min) | 1.8 | 1.7 | 2.0 | 1.7 | 9.5 |

It should be noted that the above Examples only serve to illustrate the preferred embodiment so as to help practice the present invention and are not to be interpreted such as to limit the scope of the present invention.

With this invention thus explained, it is apparent that numerous modifications and variations can be made without departing from the scope and spirit of this invention. It is therefore intended that this invention be limited only as indicated in the appended claims.

We claim:

1. A rubber modified styrenic resin composition comprising (1) 99.995–95.0 wt % of a rubber modified styrenic resin which is made from 5–100 wt % of graft copolymer (A) and 95–0 wt % of styrenic copolymer (B), wherein the graft copolymer (A) is prepared by grafting a copolymer, which is prepared from 50 to 90 wt % of vinyl aromatic monomers, 10 to 50 wt % of vinyl cyanide monomers and 0–40 wt % of copolymerizable monomers onto a dienic rubber polymer, and wherein the styrenic copolymer (B) comprises 50–90 wt % of vinyl aromatic monomers; and (2) a deodorizing agent containing 0.005 to 5.0 wt % of sesquiterpene (C) having a formula of $C_{15}H_{24}$.

2. A styrenic resin composition according to claim 1, wherein the graft copolymer (A) is an emulsion graft copolymer having the weight average particle size of 0.05 to 0.8 μm.

3. A styrenic resin composition according to claim 1, wherein the graft copolymer (A) is an emulsion graft copolymer having a bimodal particle size distribution in which the weight average particle size of the first modal is 0.05–0.18 μm and the weight average particle size of the second modal is 0.2–0.8 μm.

4. A styrenic resin composition according to claim 1, wherein the graft copolymer (A) is bulk or solution graft copolymer having the weight average particle size of is 0.2 to 10 μm.

5. A styrenic resin composition according to claim 1, wherein the graft copolymer (A) comprises an emulsion graft copolymer and a bulk or solution graft copolymer, wherein the emulsion graft copolymer has a bimodal particle size distribution in which the weight average particle size of the first modal is 0.05–0.18 μm and the weight average particle size of the second modal is 0.2–0.8 μm, and the weight average particle size of the bulk or solution graft copolymer is between 0.2 to 10 μm.

6. A styrenic resin composition according to claim 1, wherein the weight average molecular weight of the styrenic copolymer (B) is 60,000 to 400,000, the number average molecular weight of the styrenic copolymer (B) is 30,000 to 200,000.

7. A styrenic resin composition according to claim 1, wherein the content of the sesquiterpene (C) is 0.01–2.0 wt %.

* * * * *